United States Patent
Johnson et al.

(10) Patent No.: US 11,176,432 B2
(45) Date of Patent: Nov. 16, 2021

(54) PRINT MEDIA ACCUMULATORS CONTROLLED BY PRINT JOB ATTRIBUTES

(71) Applicant: HEWLETT-PACKARD DEVELOPMENT COMPANY, L.P., Spring, TX (US)

(72) Inventors: Bruce G. Johnson, Vancouver, WA (US); Matthew Douglas Reier, Vancouver, WA (US); Elliott Downing, Vancouver, WA (US); Cristopher Royce Jansson, Vancouver, WA (US); Robert Yraceburu, Vancouver, WA (US); Stuart Scofield, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/499,250

(22) PCT Filed: Sep. 1, 2017

(86) PCT No.: PCT/US2017/049904
§ 371 (c)(1),
(2) Date: Sep. 28, 2019

(87) PCT Pub. No.: WO2019/045753
PCT Pub. Date: Mar. 7, 2019

(65) Prior Publication Data
US 2021/0110224 A1    Apr. 15, 2021

(51) Int. Cl.
*G06K 15/00* (2006.01)

(52) U.S. Cl.
CPC ......... *G06K 15/403* (2013.01); *G06K 15/002* (2013.01); *G06K 15/4065* (2013.01)

(58) Field of Classification Search
CPC . G06K 15/403; G06K 15/4065; G06K 15/002
See application file for complete search history.

(56) References Cited

U.S. PATENT DOCUMENTS

| | | |
|---|---|---|
| 6,483,996 B2 | 11/2002 | Phillips |
| 7,463,376 B2 | 12/2008 | Bezenek |
| 7,864,346 B2 | 1/2011 | Ryan et al. |
| 7,894,739 B2 | 2/2011 | Gramowski et al. |
| 7,995,225 B2 | 8/2011 | Lofthus et al. |

(Continued)

FOREIGN PATENT DOCUMENTS

WO    WO-2017099743 A1 *  6/2017  ............. B65H 31/34

OTHER PUBLICATIONS

Bizhub Press C1100/c1085, Jun. 27, 2014, https://www.biz.konicaminolta/production/c1100_c1085/pdf/bizhub_press_c1100_c1085_catalog_e.pdf (Year: 2014).*

*Primary Examiner* — Juan M Guillermety
(74) *Attorney, Agent, or Firm* — HP Inc. Patent Department

(57) ABSTRACT

A finisher apparatus includes an accumulator to register a print medium of a print job in preparation for a finishing operation, memory to store an attribute of the print job, and a processor coupled to the accumulator and the memory. The processor is to execute instructions. The instructions are to control the accumulator based on the attribute of the print job.

12 Claims, 11 Drawing Sheets

(56) References Cited

U.S. PATENT DOCUMENTS

| | | | |
|---|---|---|---|
| 2006/0018696 A1 | 1/2006 | Akihito et al. | |
| 2006/0202402 A1 | 9/2006 | Nagata et al. | |
| 2008/0079763 A1 | 4/2008 | Abrott | |
| 2014/0205317 A1 | 7/2014 | Koji et al. | |
| 2014/0313540 A1* | 10/2014 | Bell | G06K 15/1822 358/1.15 |
| 2015/0316876 A1 | 11/2015 | Koji et al. | |
| 2016/0070223 A1* | 3/2016 | Yamakawa | G03G 15/6538 399/82 |
| 2016/0306595 A1* | 10/2016 | Has | G06K 15/022 |
| 2017/0158451 A1 | 6/2017 | Cedeno et al. | |
| 2017/0243089 A1* | 8/2017 | Takenaka | G06K 15/1823 |
| 2018/0251330 A1* | 9/2018 | Johnson | B65H 31/34 |

\* cited by examiner

PRINT MEDIA ACCUMULATORS CONTROLLED BY PRINT JOB ATTRIBUTES

BACKGROUND

Printing to media, such as paper; is often followed by a finishing operation. Finishing operations may be used to offset stacks of document copies, staple pages of documents together, perform stitching, and the like. Finishing operations tend to require the accumulation of sheets of print media.

DETAILED DESCRIPTION

Print jobs may undergo finishing operations at higher throughput with acceptable quality by operating a finisher on a job-specific basis. A print job attribute may be used to control an accumulator of the finisher. Attributes may include media size, orientation, ink density, media type, job size; and external factors such as environmental conditions. Attributes may be directly available to the finisher, may be measured or inferred from operation of a print engine, may be measured or inferred from operation of the finisher, or may be selected by a user. For example, a two-page print job may be processed by the accumulator with less consideration for stack appearance than a 50-page job, and thus may be completed at a higher throughput rate. Other finisher operations in addition to accumulation may be controlled based on a print job attribute.

Figure 1:
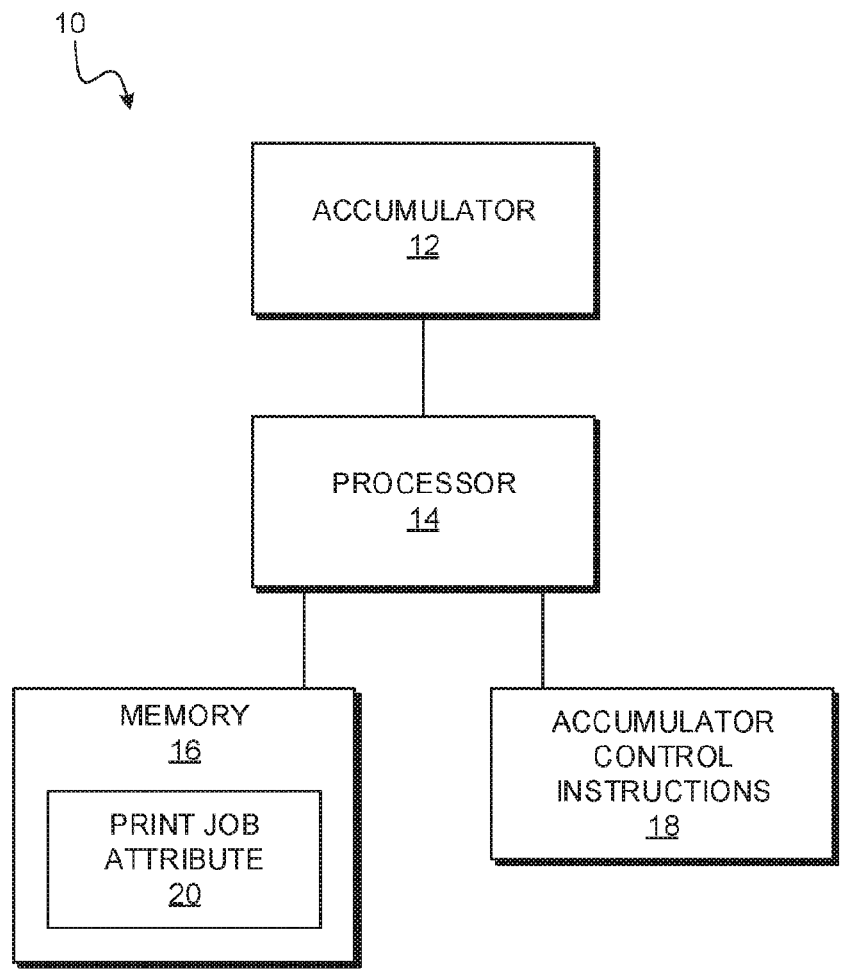
FIG. 1 is a block diagram of an example finisher apparatus.

FIG. 1 shows an example finisher apparatus 10. The finisher apparatus 10 may include an accumulator 12, a processor 14, memory 16, and instructions 18 to control an accumulator of the finisher based on an attribute 20 of a print job, which may be stored in the memory 16.

The accumulator 12 is to register a print medium of a print job in preparation for a finishing operation. An example print medium is a sheet or stack of paper. Other examples of print media include plastic film, card stock, and similar. Examples of finishing operations include stapling, offsetting, collating, binding, stamping, embossing, coating, laminating, cutting, folding, stitching, dropping, outputting, and the like. Any number of finishing operations may be performed.

The accumulator 12 may include an actuated component. An actuated component may include an actuator, such as a motor, and a component to physically manipulate print media. Examples of actuated components include a mezzanine, a channel, an edge clamp, a trailing edge clamp, a puller, and the like. The accumulator 12 may be controlled to bring print media to the correct position and orientation for performance of the finishing operation. Any number of actuated components may be provided.

The processor 14 may be coupled to the accumulator 12 to control operation of the accumulator 12. The processor 14 may be coupled to the memory 16 to communicate instructions and data therebetween to provide for execution of instructions by the processor 14. The processor 14 may include a central processing units (CPU), a microcontroller, a microprocessor, a processing core, a field-programmable gate array (FPGA), or similar device capable of executing instructions. The processor 14 may be dedicated to the finisher apparatus 10 or may provide functionality to a printer or other apparatus that includes the finisher apparatus 10.

The memory 16 may include a non-transitory machine-readable storage medium that may be any electronic, magnetic, optical, or other physical storage device that stores executable instructions. The machine-readable storage medium may include, for example, random access memory (RAM), read-only memory (ROM), electrically-erasable programmable read-only memory (EEPROM), flash memory, a storage drive, an optical disc, and the like. The machine-readable storage medium may be encoded with executable instructions. The instructions 18 may be stored in the memory 16.

The instructions 18 may be used to cause the processor 14 to control the accumulator 12 based on an attribute 20 of a print job. An attribute 20 of each print job may serve as a basis for controlling the accumulator 12 in addition to or as a modification to normal accumulator operation. Hence, job-to-job operation of the accumulator 12 may change, so as to increase throughput rate or control another aspect of job performance.

The instructions 18 may be to control whether a component of the accumulator 12 is to be used during accumulation of the print medium based on a print job attribute 20. The instructions 18 may establish that a component is not to be used when the print job attribute 20 has a specific value or value range. For example, the use of edge clamps to control sheet edge curl may be contingent on job size, that is, number of sheets. The instructions 18 may implement a job size threshold that, if the number of sheets of the job does not exceed the threshold, then edge clamps are not used during accumulation. As edge curl on smaller print jobs may be tolerated, selective use of edge clamps based on job size may increase throughput rate through the finisher apparatus 10.

The instructions 18 may be to control a speed of conveyance of the print medium by the accumulator 12 based on a print job attribute 20. The instructions 18 may accelerate or decelerate conveyance speed over a continuous range of speeds, Conveyance speed may have a continuous relationship with a value or value range of the print job attribute 20. The instructions 18 may select a discrete conveyance speed from a set of predetermined speeds. A value or value range of the print job attribute 20 may be mapped to one of the predetermined speeds. For example, the print job attribute 20 may be a page number, with a higher conveyance speed being selected for the first N page of the job, as edge catches and sheet friction may be less of concern when the accumulator 12 contains little or no print media.

The instructions 18 may be to control the accumulator 12 based on a print job attribute 20 that is based on an environmental condition in or around the accumulator 12 or finisher apparatus. An environmental condition, such as temperature or humidity, may be sensed by a sensor installed at the accumulator 12, finisher apparatus, or printer.

The instructions 18 may be to control a finishing operation of the finisher apparatus 10 based on an attribute of the print job that is the same or different attribute as used to control the accumulator 12. Various finishing operations may be, for example, sped up, slowed down, or performed according to other parameters based on a print job attribute. For instance, a stapling operation may be increased in speed if page count is lower than a threshold number of pages.

Figure 2:
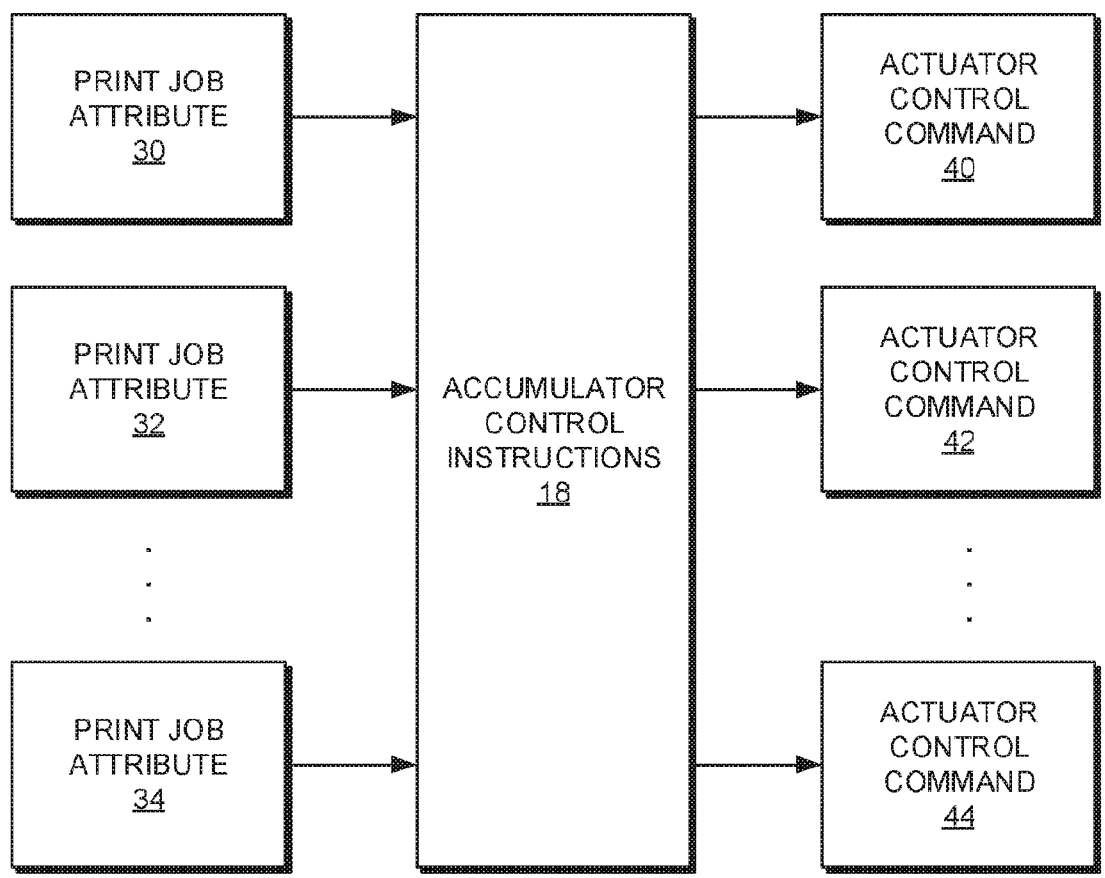
FIG. 2 is a block diagram of example accumulator control instructions.

With reference to FIG. 2, example accumulator control instructions 18 may take as input a plurality of print job attributes 30-34. The instruction may process the plurality of print job attributes 30-34 to obtain an actuator control command 40-44 to control an actuated component of an accumulator 12. Combination logic to obtain an actuator control command 40-44 from print job attributes 30-34 may include an if-then condition, a continuous function, a lookup table or matrix, a decision tree, and similar. Any number of actuator control commands 40-44 for any number of actuated components may be obtained in this way.

Figure 3:
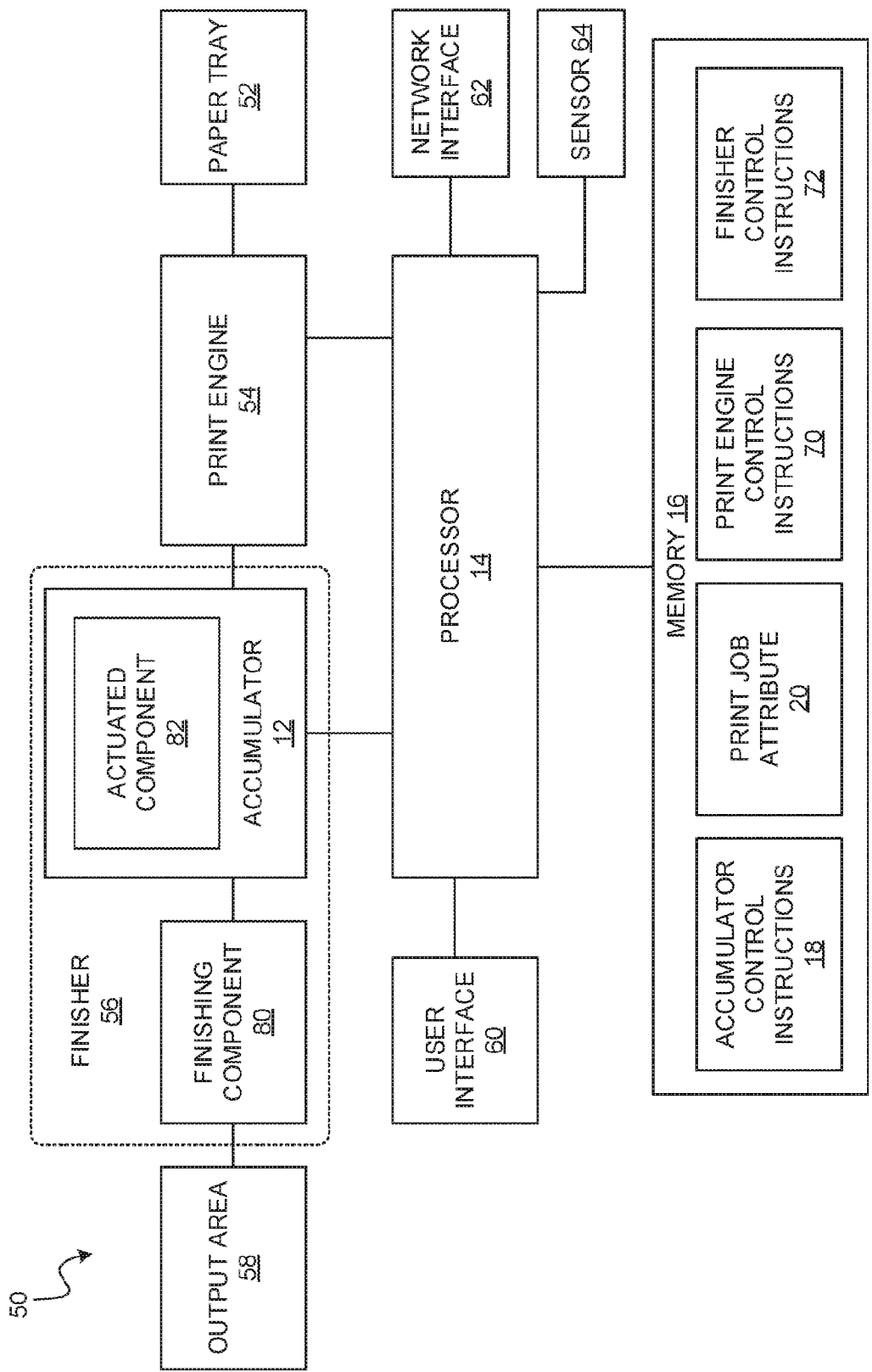
FIG. 3 is a block diagram of an example printer.

FIG. 3 shows an example printer 50. The printer 50 may include a paper tray 52, a print engine 54, a finisher 56, an output area 58, a user interface 60, a network interface 62, a sensor 64, a processor 14, and memory 16. The printer 50 may be a multi-function device that may provide functions in addition to printing, such as scanning, copying, faxing, and the like. The printer 50 or a subcombination of its components may be termed a printer apparatus.

The paper tray 52 may store paper or other print medium for feeding into the print engine 54. The print engine 54 may include components to print documents. The print engine 54 may be located upstream of the finisher 56 and provide for inkjet printing, laser printing, or similar marking of print media. The finisher 56 may be coupled to an output of the print engine 54 to receive printed pages from the print engine 54. The finisher 56 may perform any number of finishing operations on printed pages. The finisher 56 may output documents to the output area 58, such as a tray, for retrieval by a user. The user interface 60 may include a keyboard, touchscreen, display device, and similar device to receive input from the user to control the printer 50 and to output information to a user in human-perceptible form, such as by rendering a graphical user interface (GUI).

The memory 16 may store print engine control instructions 70 that are executable by the processor 14 to control the print engine 54 to mark print media. The memory 16 may also store finisher control instructions 72 that are executable by the processor 14 to control the finisher 56 to perform a finishing operation.

The finisher 56 may include a finishing component 80 and an accumulator 12 that may include an actuated component 82. The finishing component 80 is to perform a finishing operation, such as those discussed elsewhere herein. The actuated component 82 is to physically manipulate print media during the finishing operation, as discussed elsewhere herein. Any number of finishing components 80 and actuated components 82 may be provided to implement any number of finishing operations.

Print job attributes 20 may be used to carry out the printing of the image data and a finishing operation. Print job attributes 20 may include print media type (e.g., paper source, paper weight, paper quality, etc.), print media size (e.g., letter, A4, legal, etc.), print media orientation (e.g., portrait, landscape), a number of pages, a number of copies, ink density, an indication of copy collation, an indication of stapling, print engine throughput rate, print engine paper speed, printer throughput rate, a stack quality, an environmental condition, and the like. Examples of environmental conditions include temperature and humidity in or around the finisher.

A print job attribute 20 may be received at the printer 50 via the network interface 62 with a print job that includes image data to be printed. For example, media type, size, and orientation may be defined by the print job as received. A print job attribute 20 may be generated by the processor 14, the print engine 54, the finisher 56, or other component of the printer 50 prior to or during execution of a print job. For example, an actual throughput rate (e.g., sheets per minute) or an actual paper speed (e.g., inches per second) of print media through the print engine 54 may be measured or computed as the print job is underway. The accumulator control instructions 18 may request an attribute 20 from the processor 14, print engine 54, finisher 56, or other component of the printer 50. For example, the accumulator control instructions 18 may cause the processor 14 to request a speed from the print engine 54.

The accumulator control instructions 18 may cause the processor 14 to determine a print job attribute 20 by inspecting the print job. That is, prior to or during normal execution of the print job according to its attributes 20, the instructions may query the print job to obtain any attribute 20 relevant to control of the accumulator 12.

The accumulator control instructions 18 may cause the processor 14 to infer a print job attribute 20 that is not provided with the print job or otherwise readily available. For example, ink density may not be readily available. In such case, the accumulator control instructions 18 may obtain print engine throughput speed and use such speed to determine ink density of a particular sheet, as slower throughput may mean more ink is being deposited. In another example, the instructions 18 may analyze image data of the print job to determine an ink density attribute 20. Image data may include graphics, text, and other content. The instructions 18 may implement any suitable technique to analyze image data, such as pixel quantification. The instructions 18 may apply a function, lookup table or matrix, or similar to obtain an ink density attribute 20 from an image of a sheet. In these and other examples, the accumulator control instructions 18 may correlate knowable attributes of the print job to attributes 20 that are used to control the accumulator 12.

A print job attribute 20 may be specified via a user interface, such as the user interface 60 of the printer 50 or a user interface of a computer that originates a print job. Options for print job attributes 20 may be provided for the user to select. For example, stack quality may be provided as an option. A user may then select high or low stack quality, with the accumulator 12 being controlled accordingly. High stack quality may have improved appearance but may require lower speed operation of the accumulator 12. The user may choose to have print media arranged in a stack of lower quality to obtain increased throughput rate.

A sensor 64 may be used to provide data to obtain a print job attribute 20. Example sensors include a humidity sensor and a temperature sensor. The accumulator control instructions 18 may determine a print job attribute 20 based on data from the sensor 64 to control the accumulator 12 accordingly. For example, low humidity may cause ink to dry more quickly and may allow for the accumulator 12 to be operated at a higher rate.

Figure 4:
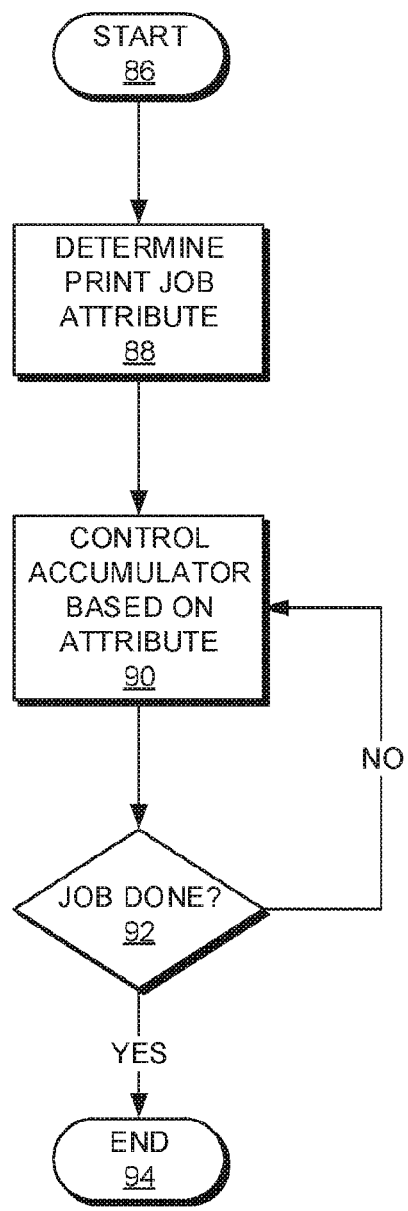
FIG. 4 is a flowchart of an example method of controlling an example accumulator based on a print job attribute.

FIG. 4 shows an example method of controlling an accumulator, such as any of the accumulators described herein, based on a print job attribute. The method starts at block 86 with the creation or reception of a print job that requires a finishing operation. At block 88, an attribute of the print job may be determined. A sensor may be referenced if the attribute is based on an environmental condition. An accumulator of a finisher may be controlled during performance of the print job based on the attribute of the print job, at block 90, until the job ends via blocks 92, 94. Block 88 may be performed before commencement of the print job or during performance of the print job.

Figure 5:
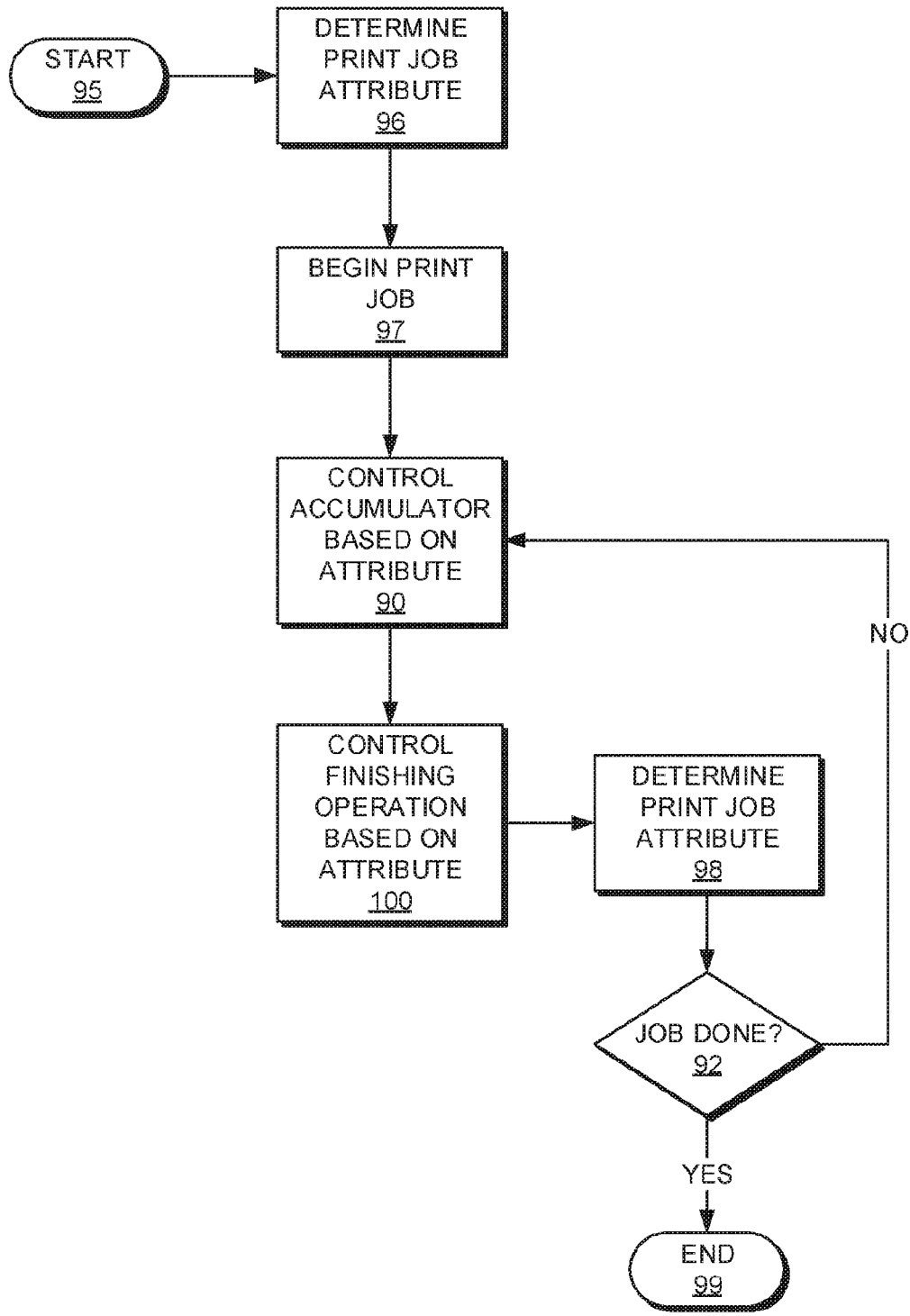
FIG. 5 is a flowchart of another example method of controlling an example accumulator based a print job attribute.

FIG. 5 shows another example method of controlling an accumulator, such as any of the accumulators described herein, based on print job attribute. The method starts at block 95 with the creation or reception of a print job that requires a finishing operation. At block 96, an attribute of the print job may be determined prior to commencement of the print job, that is for example, before a print engine has printed a first page. Next, at block 97, the print job commences. During the performance of the print job an attribute of the print job is determined, at block 98. The attribute determined during performance of the print job may be an attribute that is different from and in addition to the attribute determined prior to the start of the print job, at block 96. The attribute determined during the print job may be a redetermination of the same attribute determined prior to the start of the print job, at block 96. That, is a print job attribute may be initially determined and then re-determined during the print job. Ink density is an example of an attribute that may be determined in this way. The print job may include an initial indication of ink density, and as the job progresses, ink density may be re-determined. An accumulator of a finisher is controlled, at block 90, during performance of the print job based on the determined attribute or attributes of the print job, until the job ends via blocks 92, 99. In addition to control of the accumulator, a finishing operation may be controlled based on the determined attribute or attributes of the print job, at block 100. An attribute used to control the finishing operation may be the same attribute used to control the accumulator or may be a different attribute. For example, the speed of a stapling operation may be increase where accuracy or appearance of the stapling is less of a concern.

Figure 6:
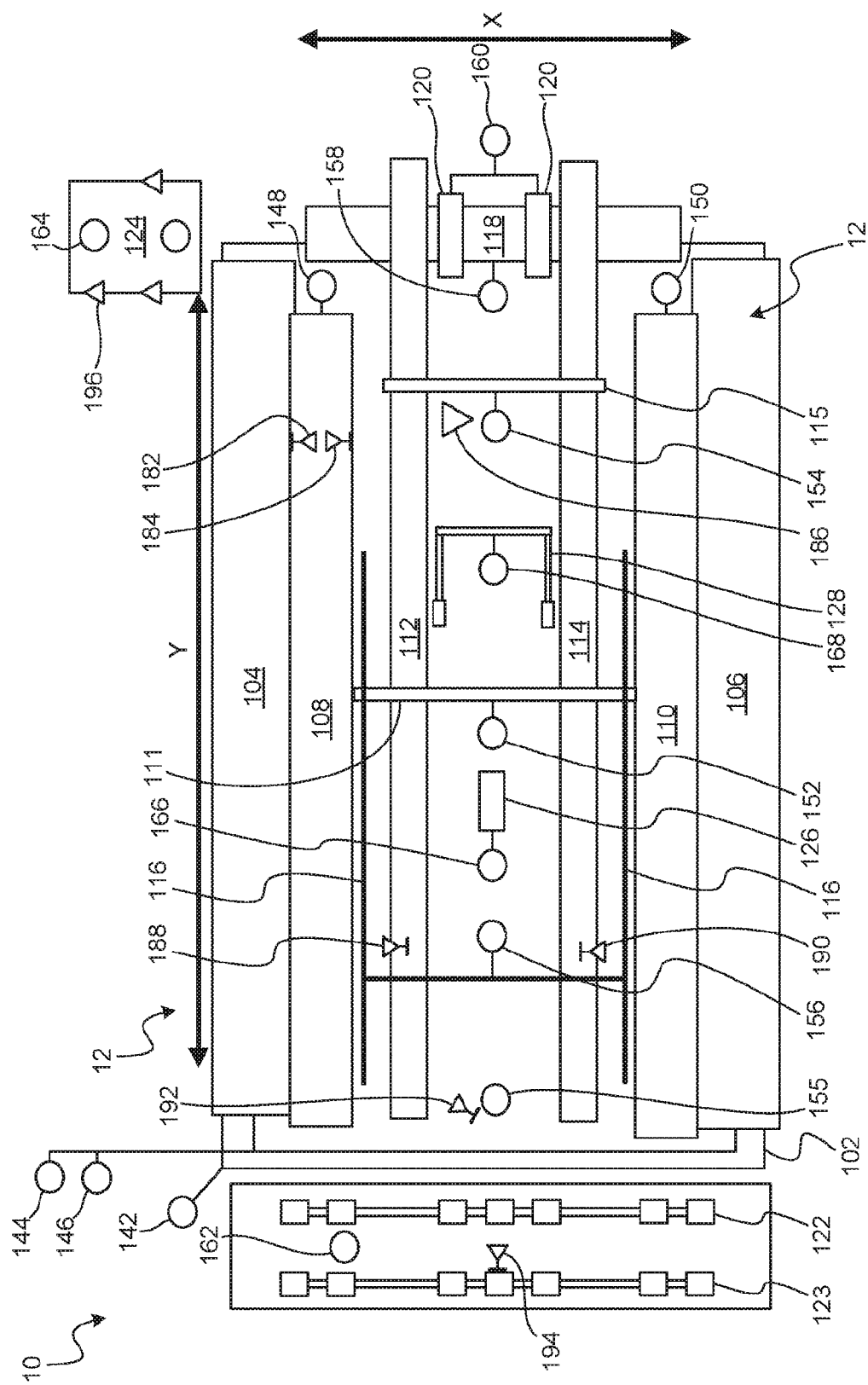
FIG. 6 is a schematic top view of an example finisher apparatus.
Figure 7:
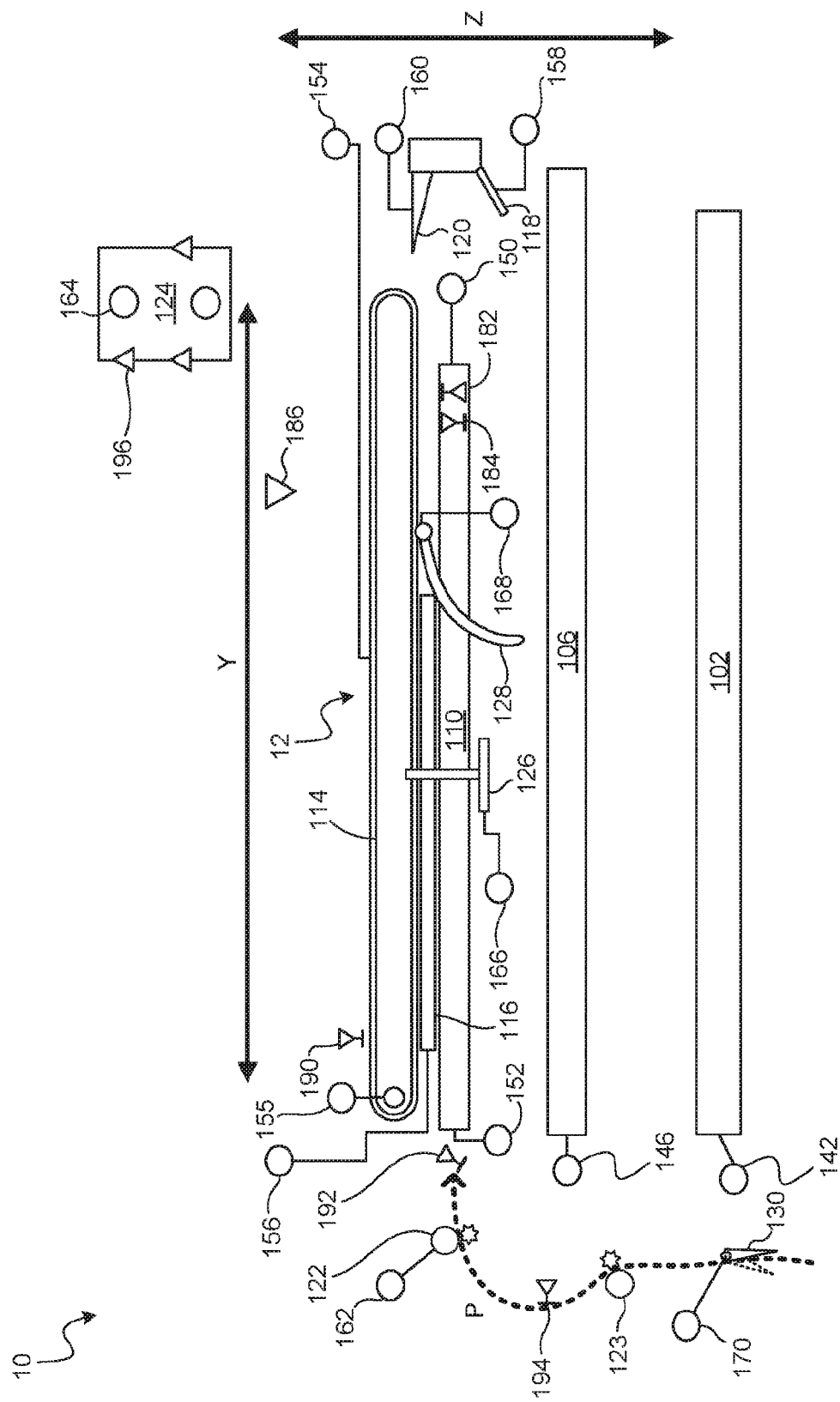
FIG. 7 is a schematic front view of an example finisher apparatus.

FIGS. 6 and 7 show an example finisher apparatus 10. An example print-medium path P is shown in FIG. 7.

The finisher apparatus 10 may include a floor 102, a rear mezzanine 104, a front mezzanine 106, a rear channel 108, a front channel 110, a channel lift mechanism 111, a rear puller 112, a front puller 114, an X-axis registration mechanism 115, edge clamps 116 (also termed bar clamps), a shelf 118, leading edge clamps 120, eject pinch rollers 122, spur pinch rollers 123, a stapler 124, an end-of-sheet clamp 126, a trailing edge clamp 128, a diverter 130, and similar. The pullers 112, 114 may be attached to a belt to provide for movement of a print medium.

The finisher apparatus 10 may further include actuators, such as motors, to actuate the components. The finisher apparatus 10 may include a floor motor 142, mezzanine motors 144, 146, a rear channel X-axis motor 148, a front channel X-axis motor 150, channel lift motor 152, a puller X-axis registration motor 154, a puller motor 155, an edge clamp motor 156, a shelf motor 158, a leading edge clamp motor 160, an eject pinch roller motor 162, a stapler motor 164, an end-of-sheet clamp motor 166, a trailing edge clamp motor 168, a diverter motor 170, and similar.

The actuators may control linear and rotational movement and positioning of various components of the finisher apparatus 10 along or about X, Y, and Z axes. For example, the stapler 124 may be actuated to move on the Y axis, the channels 108, 110 may be actuated to move on the X and Z axes, the mezzanines 104, 106 may be actuated to move on the X axis, the floor 102 may be actuated to move in on the X and Y axes, the leading edge clamps 120 may be actuated to move along the Z axis, the shelf 118 may be actuated to rotate about the X axis, and a top plate service assembly formed of the pullers 112, 114, channels 108, 110, and edge clamps 116 may be actuated to move along the X axis. Actuation of the various components of the finisher apparatus 10 realizes the finishing operations provided by the finisher apparatus 10.

The finisher apparatus 10 may further include sensors. The finisher apparatus 10 may include a channel mezzanine sensor 182, a channel X-axis registration sensor 184, a bin full sensor 186, a rear puller home sensor 188, a front puller home sensor 190, a puller entry sensor 192, an eject sensor 194, stapler sensors 196, such as a stapler motor home sensor, a low staples sensor, an out-of-staples sensor, a stapler carriage door sensor, and a media edge sensor, and similar. The sensors may be used to realize the finishing operations provided by the finisher apparatus 10.

The mezzanines 104, 106, channels 108, 110, channel lift mechanism 111, pullers 112, 114, X-axis registration mechanism 115, edge clamps 116, shelf 118, leading edge clamps 120, end-of-sheet clamp 126, trailing edge clamp 128, and related actuators and sensors may be considered an accumulator 12.

In an example operation, a document stack or copy may be assembled on the mezzanines 104, 106. After a sheet of print media is registered, the sheet may be clamped to the mezzanines 104, 106. When accumulation of the copy is complete, the mezzanines 104, 106 may transport the stack to the stapler 124 for stapling. After the copy is stapled, the mezzanines 104, 106 may transport the finished copy to a drop position. The copy may be clamped by the leading edge clamps 120 and both mezzanines 104, 106 may be moved outwards away from the copy, dropping it onto the output floor 102. The channels 108; 110 may act as paper guide surfaces for the transport of a sheet by the pullers 112, 114. The channel X-axis registration sensor 184 may be used to establish X-axis alignment of each sheet during the accumulation of a stack. The pullers 112, 114 may grip the leading edge of each sheet and pull the sheet to X and Y alignment positions. The edge clamps 116 may be moved along the X-axis on the edge of a sheet to control sheet curl, and may be moved to specific locations based on sheet size and orientation.

Figure 8:
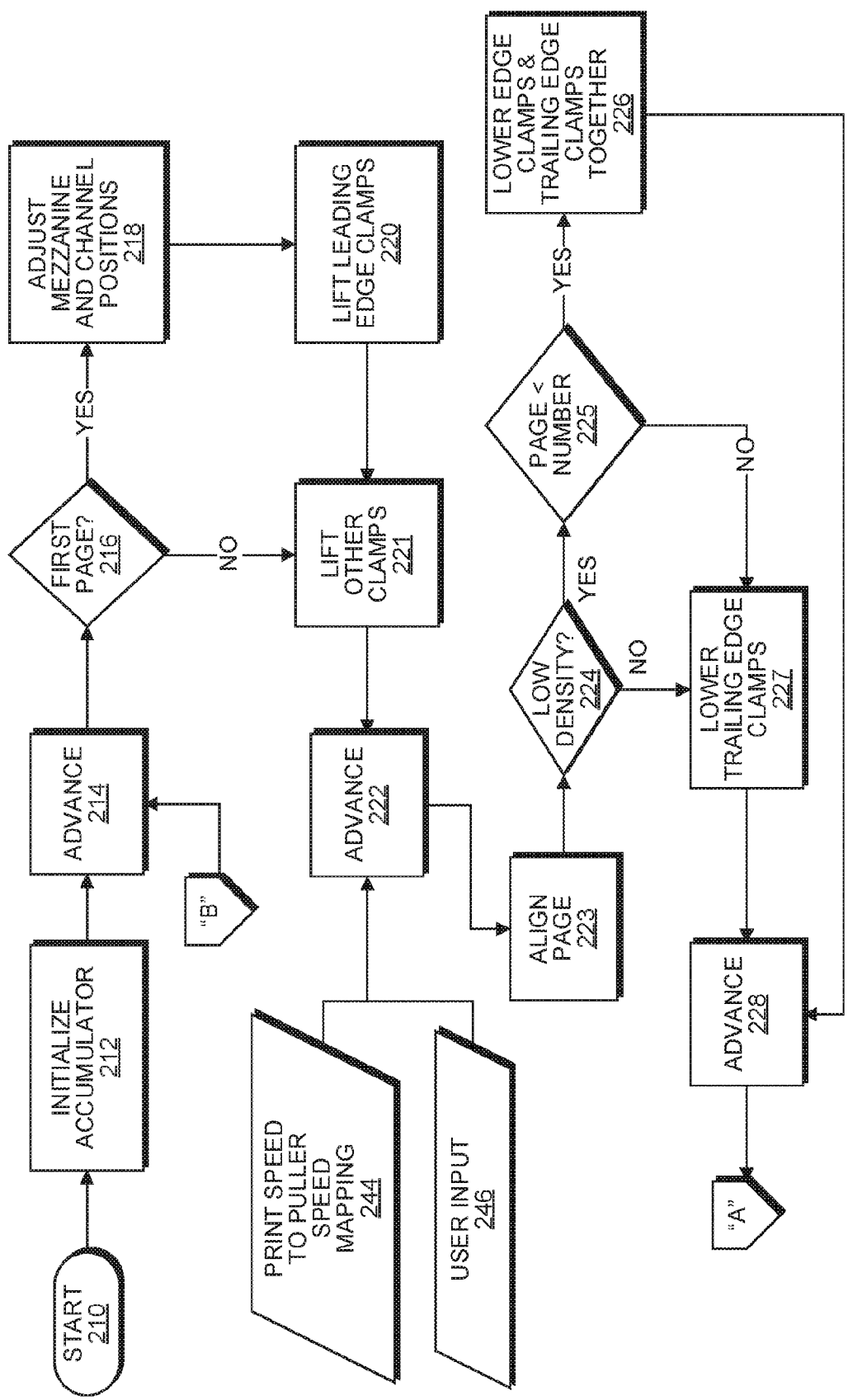
FIG. 8 is a flowchart of another example method of controlling an example accumulator based on a plurality of print job attributes.
Figure 9:
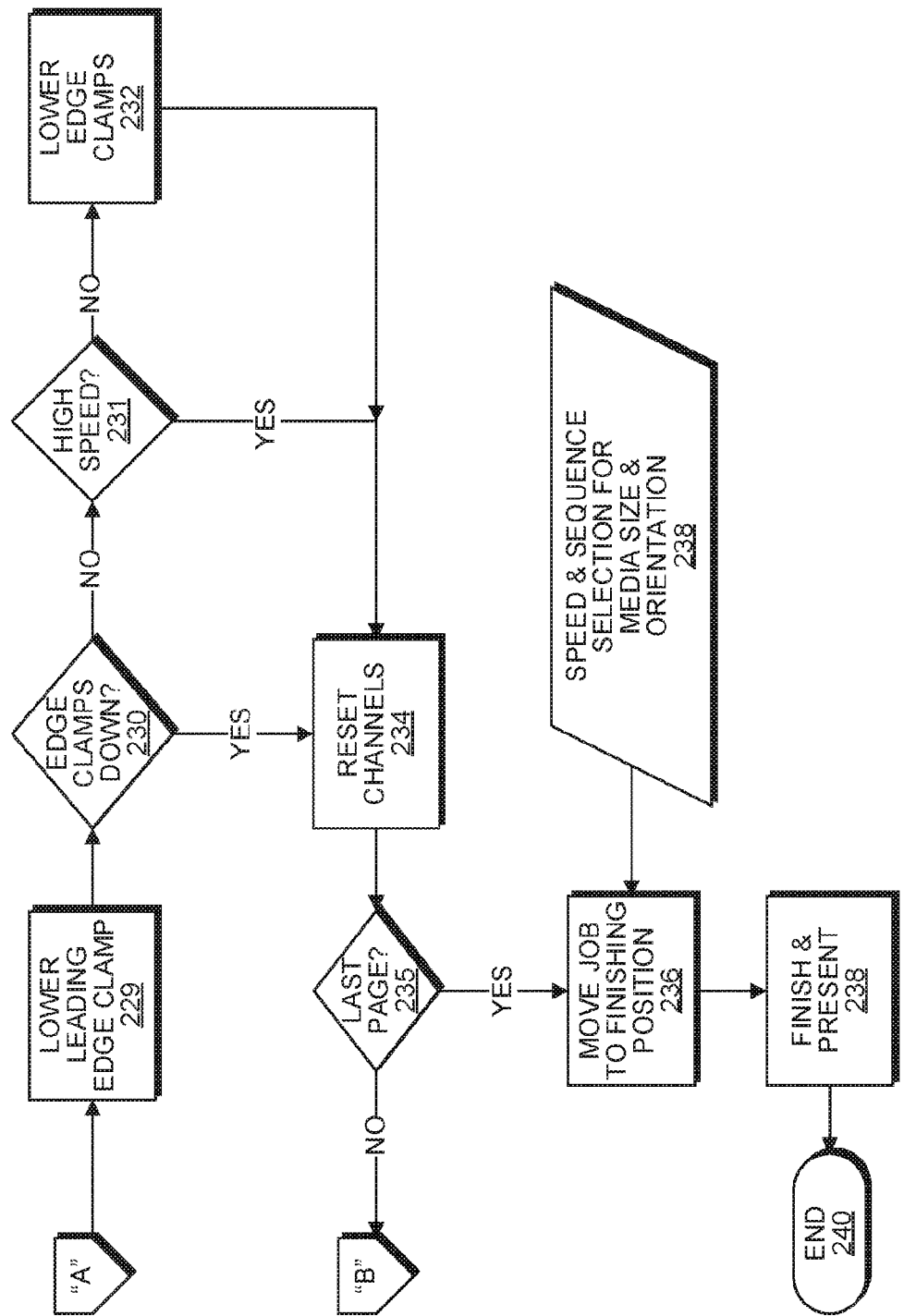
FIG. 9 is a continuation of the flowchart of FIG. 8.

FIGS. 8 and 9 show an example method of controlling a finisher apparatus, such as a finisher apparatus that includes the example accumulator depicted in FIGS. 6 and 7, based on print job attributes. The method starts at block 210 with the creation or reception of a print job that requires a finishing operation.

At block 212, the accumulator is initialized for a new sheet of print media incoming from a print engine. This may include configuring pullers 112, 114 to accept the sheet.

At block 214, the pages are advanced toward the pullers 112, 114 and may begin transport via the pullers 112, 114 toward the alignment positions.

If the current sheet of print medium is the first page of the print job, as determined at block 216, then positions of mezzanines 104, 106 may be adjusted for the nominal X-axis size of the sheet and the channels 108, 110 may be adjusted, at block 218.

Subsequently, at block 220, the leading edge clamps 120 may be lifted. Subsequent to lifting the leading edge clamps 120 or, if this is not the first page of the print job, other clamps, such as the edge clamps 116, end-of-sheet clamp 126, and trailing edge clamp 128, may be lifted, at block 221.

At block 222, the pullers 112, 114 may be advanced to a position, as determined by one or more sensors for performing X-axis registration at block 223. During the advance, the pullers 112, 114 may reference a print job attribute, such as a speed mapping, user input, and the like. A print speed to puller speed mapping 244 may be used to adjust puller speed based on a speed of the print engine. That is, a relationship between print speed and puller speed may defined and then referenced when the pullers 112, 114 are advanced. User input 246 indicating a speed for the pullers 112, 114 may be referenced. For example, a user may indicate that speed through the finisher takes priority over an aesthetic characteristic of a printed document.

At the X-axis registration point referenced previously, the pullers may be stopped, channels 108, 110 may be opened, and an X-axis measurement of the sheet of print medium may be taken. In the current example, the leading edge clamps 120 may lift to allow the pullers 112, 114 to advance for completing the Y-axis registration. This example of registration is shown as block 223.

At block 224, a print job attribute, such as density, may be considered. Density may be a density of the print medium, an ink density, or a combination of such. Ink density may be determined from print job image data or print engine throughput rate, as discussed elsewhere herein. Print medium density may be determined from a thickness measurement of a sheet of print medium taken by the finisher or by user-provided information concerning the print medium, such as an indication of the kind of media loaded into a paper tray (e.g., brochure, heavy card stock, plain paper, etc.).

At block 225, another print job attribute, such as page number, may be considered. The current page number may be compared to a threshold page number That is, finisher operational behavior may change once a certain number of pages has been exceeded.

If the density is lower than a threshold density and the current page number is lower than a threshold page number, then the edge clamps 116 and trailing edge clamp 128 may be lowered together, at block 226. Otherwise, the trailing edge clamp 128 may be lowered, at block 227.

Subsequently, at block 228, the pullers 112, 114 may be advanced to a position, such a position that is clear of the sheet. The leading edge clamps 120 may then be lowered, at block 229.

At block 230, it may be determined whether the edge clamps 116 are down. If the edge clamps 116 are down, then the channels 108, 110 may be reset, at block 234. If the edge clamps 116 are not down and a print job attribute requesting or indicating high speed finishing exists, at block 231, then the channels 108, 110 may be reset, at block 234. If the edge clamps 116 are not down and a print job attribute requesting or indicating high speed finishing has not been specified, then the edge clamps 116 may be lowered, at block 232, prior to the channels 108, 110 being reset at block 234.

The method returns to block 214 for the next page, until it is determined that a last page is reached, at block 235.

Once the last page of the print job has been accumulated, then the document may be moved to a finishing position for a finishing operation, at block 236. A print job attribute 238, such as media size or orientation, may be referenced to select a speed and sequence for moving the document to the finishing position. Other example print job attributes 238 include a user-specified speed and a speed determined from a print engine. A print job attribute may be used to control the finishing operation.

The finishing operation is performed and the document is presented to the user as completed, at block 240, and the method ends, at block 240. The method may be repeated with the same print job attributes for multiple copies of a document in a particular print job.

Figure 10:
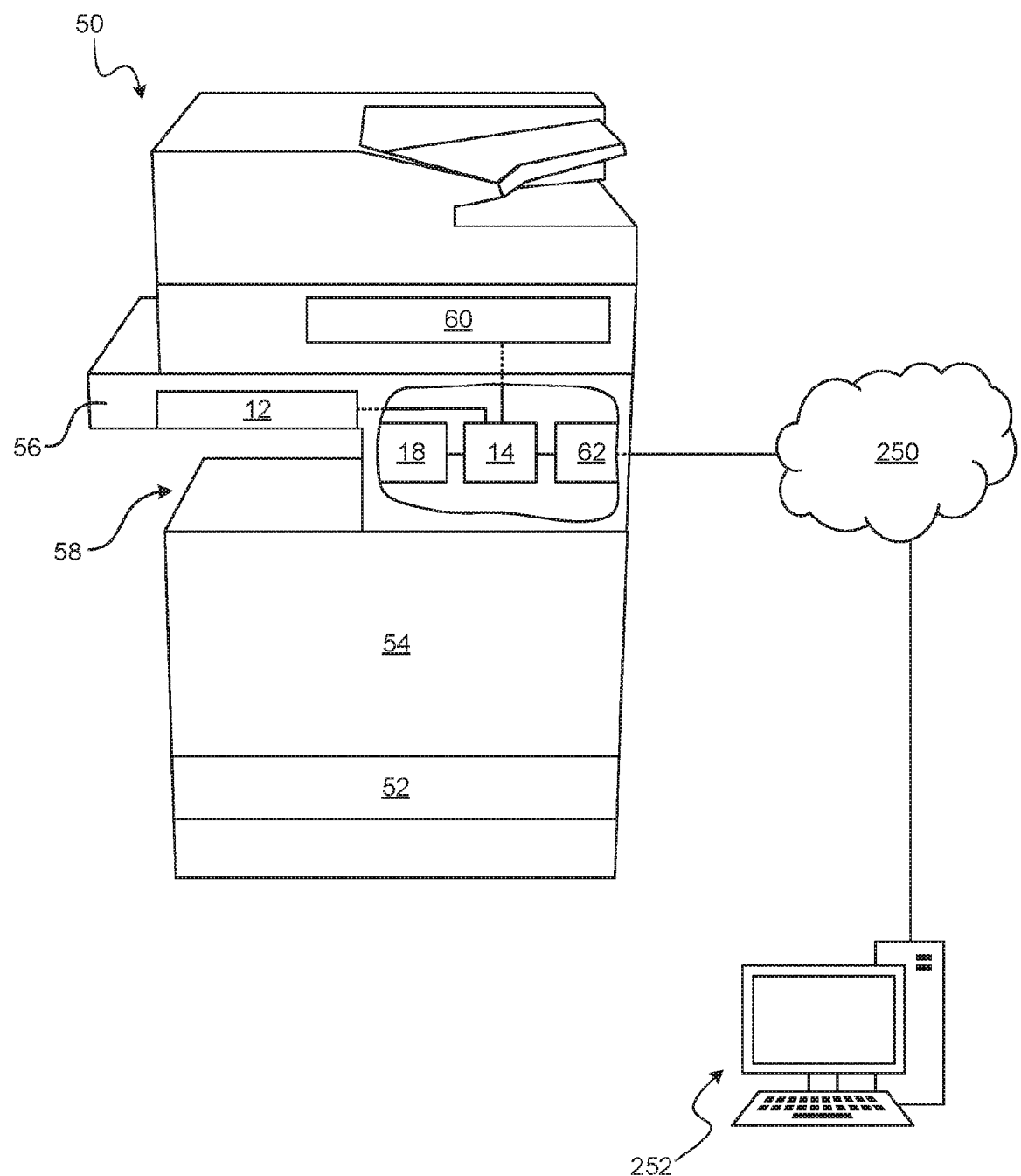
FIG. 10 is a schematic diagram of an example system.

FIG. 10 shows an example printer 50 connected to a computer network 250 via a network interface 62. A computer 252 may connect to the printer 50 via the network 250 to transmit print jobs to the printer 50. The computer 252 may output a user interface that allows user selection of an option to set an accumulator control attribute for a print job.

Figure 11:
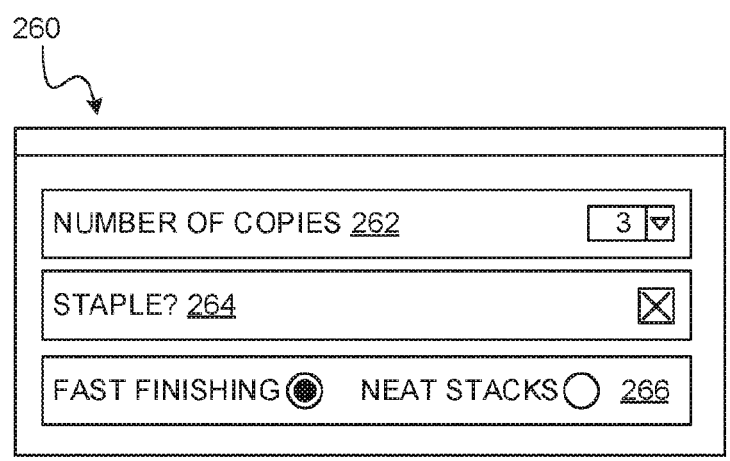
FIG. 11 is a diagram of an example graphical user interface.

FIG. 11 shows an example GUI 260 user selection of an option to set an attribute for a print job. The GUI 260 may be outputted at a user interface 60 of a printer 50 that executes print jobs. The GUI 260 may be outputted at a user interface of a computer 252 that creates or manages print jobs.

The GUI 260 may include a user interface element 262 to select a printing directive, such as a number of copies of a document to print.

The GUI 260 may include a user interface element 264 to select a finishing operation, such as whether the document is to be stapled.

The GUI 260 may include a user interface element 266 to select an attribute for operation of a finisher. Such an option may be presented to the user in a user-friendly manner. One selection may control several attributes. For example, a selection of "fast finishing" may set attributes that operate pullers of the accumulator at a higher speed without the use of edge clamps. A selection of "neat stacks" may set attributes that operate the pullers at a lower speed with the use of edge clamps. A user who can tolerate a document whose pages are stacked with suboptimal appearance may benefit from faster throughput.

The techniques described above may increase print job throughput without the need for additional finishing components or the use of an additional finisher. These techniques may be particularly suitable for inkjet printing, when compared to laser printing, as the possibility of the presence of varying amounts of drying ink on a sequence of printed sheets may lead to a tendency to design and operate accumulators conservatively. The techniques described herein include using density to control the accumulator, so that conservative or "one-size-fits-all" design and operation may be avoided. Small print jobs may benefit from increased throughput by using print job attributes to control the accumulator, while larger print jobs may also benefit or may not significantly suffer. In addition, selective use of finisher components, as discussed herein, may reduce noise of operation of the accumulator.

It should be recognized that features and aspects of the various examples provided above can be combined into further examples that also fall within the scope of the present disclosure. In addition, the figures are not to scale and may have size and shape exaggerated for illustrative purposes.

The invention claimed is:

1. A finisher apparatus comprising:
   an accumulator to register a print medium of a print job in preparation for a finishing operation; memory to store an attribute of the print job; and a processor coupled to the accumulator and to the memory, the processor to execute instructions, the instructions to control the registration of the print medium by the accumulator based on the attribute of the print job, wherein the instructions are to determine the attribute from a user-selected option for the print job and to control a speed of conveyance of the print medium by the accumulator.

2. The apparatus of claim 1, wherein the instructions are to control whether a component of the accumulator is to be used during accumulation of the print medium.

3. The apparatus of claim 1, wherein the instructions are to control the accumulator based on a combination of a plurality of attributes, including the attribute.

4. The apparatus of claim 1, wherein the instructions are to determine the attribute by inspecting the print job.

5. The apparatus of claim 1, wherein the instructions are to determine the attribute from operation of a print engine that is upstream of the finisher apparatus.

6. The apparatus of claim 1, wherein the instructions are to determine the attribute as an ink density of a print job.

7. A printer apparatus comprising:
a print engine to print to a print medium;
a finisher coupled to the print engine, the finisher to perform a finishing operation on the print medium, the finisher including an accumulator to register a print medium of a print job in preparation for a finishing operation; and
a processor coupled to the accumulator, the processor to execute instructions, the instructions to control the registration of the print medium by the accumulator based on an attribute of the print job, wherein the instructions are to determine the attribute from a user-selected option for the print job and to control a speed of conveyance of the print medium by the accumulator.

8. A method comprising:
determining an attribute of a print job, the print job to be processed by a print engine and a finisher that includes an accumulator to register a print medium in preparation for a finishing operation;
and during performance of the print job, controlling the registration of the print medium by the accumulator based on the attribute of the print job and outputting a graphical user interface to determine the attribute from a user selection and to control a speed of conveyance of the print medium by the accumulator.

9. The method of claim 8, further comprising controlling the finishing operation based on the attribute of the print job or based on another determined attribute of the print job.

10. The method of claim 8, further comprising determining the attribute during performance of the print job.

11. The method of claim 8, further comprising determining the attribute based on an environmental condition.

12. The method of claim 8, further comprising analyzing image data of the print job to determine the attribute.

* * * * *